Jan. 10, 1950      S. C. HETH      2,494,388
COMBINATION HARVESTING AND ENSILAGE CUTTING MACHINE
Filed June 16, 1944
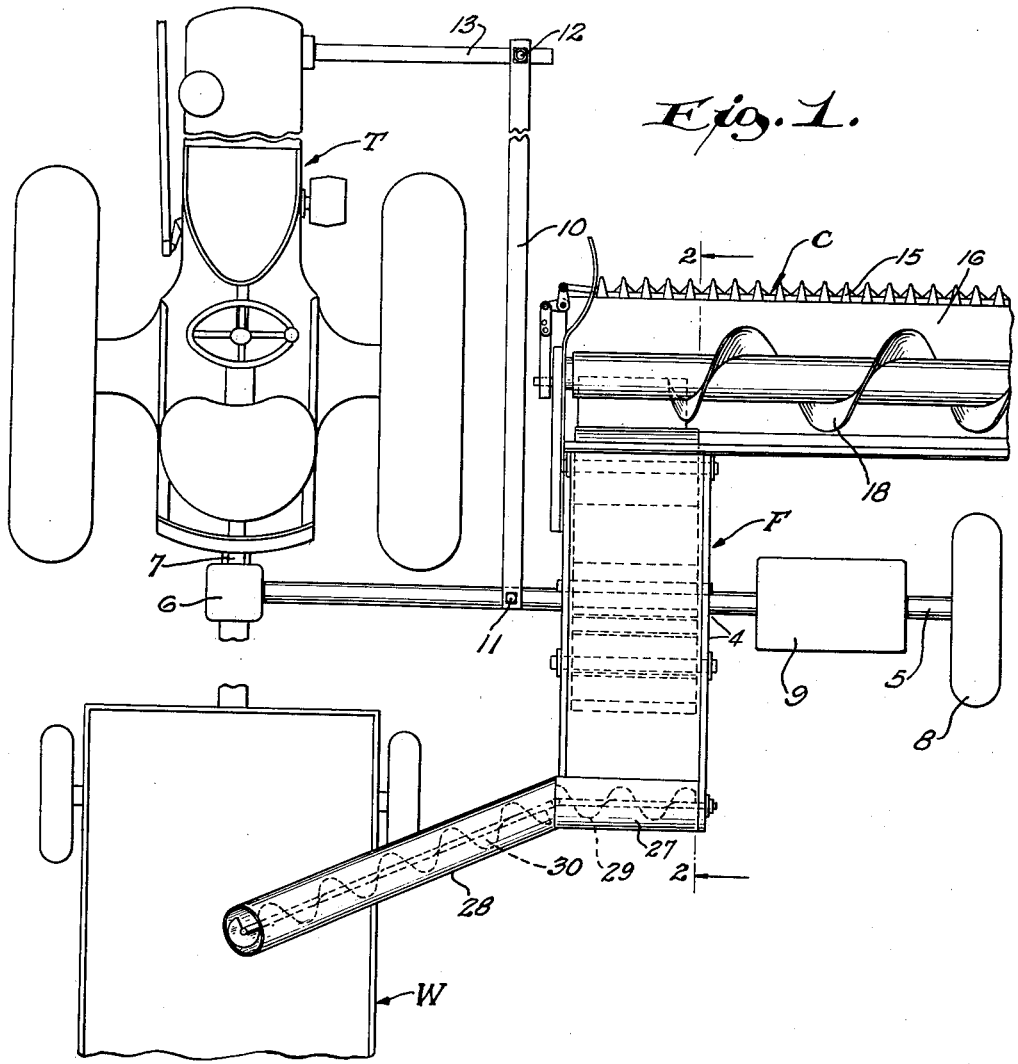
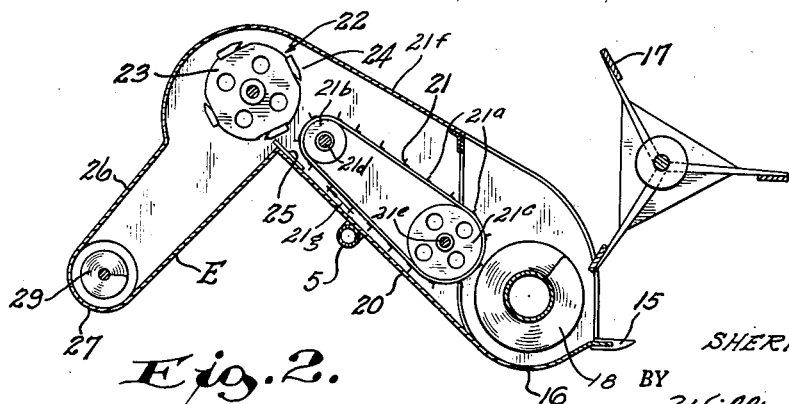
INVENTOR.
SHERMAN C. HETH
BY William F. Buckley.
ATTORNEY.

Patented Jan. 10, 1950

2,494,388

UNITED STATES PATENT OFFICE 2,494,388

COMBINATION HARVESTING AND ENSILAGE CUTTING MACHINE

Sherman C. Heth, Racine, Wis., assignor to J. I. Case Company, Racine, Wis., a corporation of Wisconsin Application June 16, 1944, Serial No. 540,580

3 Claims. (Cl. 56—23)

This invention relates to a combination harvesting and ensilage cutting machine.

An object of the invention is to provide a machine of this character which is simple, compact and closely organized in construction, especially in the means provided for conveying the cut material from the sickle to the ensilage cutter, and for delivering material after it has been chopped up by the ensilage cutter to a receiving wagon or trailer.

Another object of the invention is to provide a machine of this character which is partially supported by the tractor and, of course, pulled thereby. The various instrumentalities of the machine may be power driven from the tractor or, where a small tractor is used, the machine may be equipped with an auxiliary power plant.

A still further object of the invention is to provide a machine having these advantages, and which is highly efficient and flexible in operation, easy and comparatively inexpensive to manufacture, and susceptible to facile and convenient control by a single operator.

These objects of the invention and other ancillary advantages are attained by the mechanism, construction, and arrangement illustrated in the accompanying drawings forming part hereof, in which—

Fig. 1 is a fragmentary plan view illustrating diagrammatically a machine embodying the present invention, the reel being omitted for the sake of simplicity in illustration; and Fig. 2 is a fragmentary view in longitudinal vertical cross section taken on line 2—2 of Fig. 1.

Referring to the drawings, the machine embodying the present invention is designated as a whole at C, and is adapted to be pulled across the field by means of a tractor T. The machine is accompanied or trailed by a wagon, trailer or mobile receptacle W.

The machine includes a suitable mobile frame designated as a whole at F. The frame F is pivotally supported at 4 on an intermediate portion of an axle 5, any suitable or well-known means being used to rock the frame in conventional manner to adjust the cutting height. One end of the axle 5 extends into and is supported on a gear box 6. The gear box 6 is mounted on the power takeoff 7 of the tractor. The opposite end of the axle is supported on a ground wheel 8.

Where a small tractor is used an auxiliary power plant 9 may be utilized to drive the instrumentalities of the machine.

A draw bar 10 has one end pivotally connected to the axle as at 11 and has its forward end pivotally connected as at 12 to a pull arm 13 fixed to and projecting laterally from the tractor.

The machine C includes a header which comprises a sickle 15 mounted at the forward end of an auger trough 16. A reel 17 is provided for pushing the cut vegetation into the auger trough. An auger or cross conveyor 18 is operative in the auger trough to advance the cut material deposited thereon to the tractor side of the trough. A feed deck 20 inclines upwardly and rearwardly from the auger trough 16 and over and rearwardly with respect to the axle 5. A feed rake or raddle 21 is provided to advance the cut material up along the feed deck as fully set forth in the J. I. Case Company publication entitled "The New Model 'M'," Form A29943D.

Feed rake 21 comprises an endless flexible element having a plurality of cleats or the like $21^a$ and disposed about pulleys or sprockets $21^b$ and $21^c$ supported respectively on shafts $21^d$ and $21^e$ supported in a housing portion $21^f$ cooperating with above mentioned deck 20 to enclose rake 21. In practice shaft $21^b$ (for example) is rotated by an appropriate or well-known type of connection with power source 6 in a direction such that rake 21 travels as indicated by arrow $21^g$ so as to strip cut material from auger 18 and press such material between itself and deck 20, the motion sliding the material in an upward and backward direction to be cut into ensilage.

At the upper end of the feed deck an ensilage cutter designated as a whole at 22 is provided. The ensilage cutter may be of any suitable construction and is diagrammatically illustrated as comprising a rotor 23 carrying knives 24 defining a basket-like structure or cutter cylinder. The knives 24 cooperate with the fixed knife or abutment plate 25 provided at the upper end or discharge end of the feed deck.

As the material is chopped up by the ensilage cutter, it immediately falls into a delivery chute 26 terminating at its lower end in a delivery trough 27. The discharge end of the delivery trough 27 communicates with a delivery spout 28 which inclines upwardly and extends laterally and rearwardly of the machine so as to overlie and be operative to deposit material into the receiving wagon or trailer W.

An auger 29 operates in the delivery trough 27 to advance the chopped up material to the delivery spout where it is picked up by an auger 30, the latter functioning to carry it up through the delivery spout and discharge it therefrom into the receiving wagon or trailer W.

The machine has only been diagrammatically illustrated as the invention claimed is the simple, light weight, compact organization of a header, including a sickle with an auger trough immediately behind the sickle into which the cut material is directly impelled, in combination with a feed rake for advancing the material directly from the auger trough to an ensilage cutter disposed at the upper end of the feed deck, and with a delivery chute and delivery spout and appropriate means for conveying the chopped up material from the bottom of the delivery chute, out through the delivery spout. This, it is thought, is a substantial advance in the art.

Another feature which is believed to be of importance is the manner of supporting the header, feed deck, ensilage cutter and other instrumentalities in a pivotal fashion on the axle, the axle in turn being partially supported by a ground wheel and partially supported by the tractor.

As will be well understood by those skilled in the art, appropriate driving connections or motion transmission means are provided between the power takeoff 7 and the operative instrumentalities of the machine previously described. As they form no part of the present invention it is thought that they need not be illustrated or described. The same is also true of the manner of operatively interconnecting the auxiliary engine 9, where one is employed with the instrumentalities driven therefrom.

While I have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

What I claim is:

1. In an ensilage harvester, a cutter part including a cutting cylinder having a plurality of cutting elements movable in a substantially cylindrical path and an abutment plate in working relation to said cutting elements, a header part associated with the cutter part including a cross conveyor housing and a feeder house, a cross conveyor in said cross conveyor housing, said cross conveyor housing leading to said feeder house, said feeder house having a smooth upwardly and rearwardly inclined deck leading from said cross conveyor to said abutment plate, said deck being positioned to provide a surface which, extended, would intersect said cylindrical path, a feed rake in said feeder house and having a run moving upwardly proximate said deck and so positioned as to receive cut material from said cross conveyor beneath itself and to deliver same to said cutting cylinder, and said feed rake moving so as to slide said material upwardly over the deck in a controlled manner and to deliver it over said abutment plate at a rate determined by movement of said feed rake, directly to said cutting cylinder.

2. In an ensilage harvester, a cutting cylinder having a plurality of cutting elements movable in a substantially cylindrical path, a feeder deck positioned to approach the path of travel of said cutting elements and so placed as to provide a surface which, extended, would intersect said cylindrical path, and undershot feed rake having a run moving toward said cutting cylinder proximate said feeder deck and positioned to receive crop material between itself and said deck and to slide said crop material on said deck and to project it beyond said deck, and said cutting elements approaching said deck and feed rake closely enough to operate on material projected beyond but still held by said deck and feed rake.

3. In an ensilage harvester the combination of a header, an auger conveyor in the header, a cutting cylinder spaced to the rear of and above said auger conveyor and having a plurality of cutting elements movable in a substantially cylindrical path, an abutment plate in working relation to said cutting elements and a feeder house extending upwardly and rearwardly between said header and said cylinder, said auger extending into said feeder house, an upwardly and rearwardly inclined deck in said feeder house positioned to provide a surface which, extended, would intersect said cylindrical path, a feed rake in said feeder house having a run moving upwardly proximate said deck and positioned to receive between itself and said deck cut material from said auger and to deliver same to said cutting cylinder, said feed rake being driven in a direction to slide said material upwardly on the deck in a controlled manner and to deliver it at a rate determined by movement of said feed rake directly to said cutting cylinder.

SHERMAN C. HETH.

REFERENCES CITED

The following references are of record in the file of this patent:

UNITED STATES PATENTS

| Number | Name | Date |
|---|---|---|
| 1,879,960 | Thoen | Sept. 27, 1932 |
| 1,882,823 | Hale et al. | Oct. 18, 1932 |
| 1,926,709 | Bunting | Sept. 12, 1933 |
| 1,942,037 | Pierson | Jan. 2, 1934 |
| 1,980,027 | Adams | Nov. 6, 1934 |
| 2,044,139 | Welty | June 16, 1936 |
| 2,253,633 | Lindly | Aug. 26, 1941 |
| 2,269,828 | Michel et al. | Jan. 13, 1942 |
| 2,312,838 | Johnston | Mar. 2, 1943 |